(12) United States Patent
Voigt et al.

(10) Patent No.: US 12,180,664 B2
(45) Date of Patent: Dec. 31, 2024

(54) CONTROL AND OPERATION OF DEICING SYSTEM

(71) Applicant: THE TORO COMPANY, Bloomington, MN (US)

(72) Inventors: David Voigt, Le Center, MN (US); Jordan Smith, Madison Lake, MN (US); Seth Ferkenstad, Mankato, MN (US); Derek Meyer, Mankato, MN (US)

(73) Assignee: THE TORO COMPANY, Bloomington, MN (US)

( * ) Notice: Subject to any disclaimer, the term of this patent is extended or adjusted under 35 U.S.C. 154(b) by 645 days.

(21) Appl. No.: 17/358,925

(22) Filed: Jun. 25, 2021

(65) Prior Publication Data

US 2022/0412029 A1 Dec. 29, 2022

(51) Int. Cl.
| | |
|---|---|
| *G06F 17/00* | (2019.01) |
| *E01H 10/00* | (2006.01) |
| *G05D 1/00* | (2006.01) |
| *G06Q 10/0631* | (2023.01) |
| *G07C 5/00* | (2006.01) |
| *H04W 4/40* | (2018.01) |

(52) U.S. Cl.
CPC ......... *E01H 10/007* (2013.01); *G05D 1/0022* (2013.01); *G05D 1/0276* (2013.01); *G06Q 10/063114* (2013.01); *G07C 5/008* (2013.01); *H04W 4/40* (2018.02)

(58) Field of Classification Search
CPC .. E01H 10/007; G05D 1/0022; G05D 1/0276; G05D 2201/0213; G06Q 10/063114; G07C 5/008; H04W 4/40

USPC .......................................................... 701/2
See application file for complete search history.

(56) References Cited

U.S. PATENT DOCUMENTS

| | | | |
|---|---|---|---|
| 3,243,123 A * | 3/1966 | Inghram | B64F 5/20 |
| | | | 239/196 |
| 9,046,895 B2 | 6/2015 | Orr et al. | |
| 9,330,367 B2 | 5/2016 | Larsen | |
| 9,403,178 B2 | 8/2016 | Mologousis | |
| 9,463,483 B2 | 10/2016 | Gudat et al. | |
| 9,884,330 B2 | 2/2018 | Humpal et al. | |
| 10,485,229 B2 | 11/2019 | Hammer et al. | |
| 10,494,772 B1 | 12/2019 | Boston et al. | |
| 2003/0127154 A1* | 7/2003 | Kneringer | B60P 3/228 |
| | | | 141/95 |
| 2014/0151463 A1* | 6/2014 | Ward | E01H 10/007 |
| | | | 239/172 |
| 2016/0281311 A1* | 9/2016 | Jaccoma | G05D 1/0094 |

(Continued)

OTHER PUBLICATIONS

Control and Operation of Deicing System (Year: 2021).*

(Continued)

*Primary Examiner* — Ronnie M Mancho

(74) *Attorney, Agent, or Firm* — MARSHALL, GERSTEIN & BORUN LLP

(57) ABSTRACT

A method of operating a deicing system remotely, including connecting a control for the deicing system with the deicing system. When the control and the deicing system are connected, the method includes providing functionality for controlling operation of the deicing system, including control of application rates, and managing workflow and operation including job tracking.

21 Claims, 16 Drawing Sheets

(56) References Cited

U.S. PATENT DOCUMENTS

2020/0016977 A1* 1/2020 Lehman ................... E01H 3/02
2022/0379328 A1* 12/2022 Crawford ............. H02J 7/0042

OTHER PUBLICATIONS

YouTube, "VSI New Liquid De-Icing Boom Testing", posted on Aug. 31, 2018, and retrieved from the Internet at: <https://www.youtube.com/watch?v=fXTGzlhWVxY&t=749s> on Oct. 7, 2022.
YouTube, "L8000 De Icing Test Truck", posted on Mar. 4, 2019 and retrieved from the Internet at: <https://www.youtube.com/watch?v=GbHcp9mWUhQ> on Oct. 7, 2022.
YouTube, "Micro-Trak Roadmaster Training", posted on Jan. 19, 2016 and retrieved from the Internet at: <https://www.youtube.com/watch?v=mXoOhvTiKGQ> on Nov. 15, 2022.

* cited by examiner

CONTROL AND OPERATION OF DEICING SYSTEM

RELATED APPLICATION

The present application is related to deicing systems used for ice and/or snow removal, such as those disclosed in commonly owned and co-pending U.S. patent application entitled "MODULAR BOOM FOR SURFACE DEICING WITH BRINE".

FIELD

The present disclosure relates controlling operation of a deicing/snow removal system. More particularly, the present disclosure relates to a mobile application and method for managing jobs, tracking jobs, adjusting application parameters based on details including but not limited to a speed of travel of the deicing system.

BACKGROUND

Many people use rock salt to remove snow and ice from runways, roads, parking lots, walkways, and the like. However, rock salt has many drawbacks including the fact that the snow and/or ice needs to start melting prior to the rock salt beginning to work. If the temperatures are sufficiently cold, the snow and/or ice may not begin to melt, which renders the rock salt ineffective until the weather warms. As such, there are many instances that rock salt is ineffective in removing snow and/or ice.

Further, rock salt is commonly spread on surfaces with sand, which is used for traction. The rock salt and sand collect in shoes and creates messes in establishments. Cleaning the establishments of rock salt and sand adds to the janitorial costs of maintaining the cleanliness of establishments.

Instead of using rock salt and sand, others pretreat surfaces with a brine solution prior to a pending snowstorm. When the application is timed correctly, the brine prevents snow and ice from sticking to the runways, roads, parking lots and walkways, which makes snow removal more efficient, both in time and cost. However, if the precipitation falls in the form of rain prior to snowing, the brine can be washed from the surface and rendered ineffective. Further, if the temperature drops below the freezing temperature of the brine prior to the snow falling, the brine is also rendered ineffective.

Instead of using rock salt and sand or pretreating a surface with brine, it has been found that the brine can be applied after a snow, typically after the surface has been plowed or snow-blown. However, the post treatment with brine can be utilized without having prior snow removal. Post treating the surface with slightly more liquid deicing solution than used to pretreat the surface, such as 10 to 15% by volume, effectively removes snow and deices the surface without the need for pretreating. Using only post snow treatment eliminates the cost of pretreatment and the wear on equipment caused by the need for two passes per snow event.

It has been determined that brine works three to four times faster than rock salt and is more ecofriendly than rock salt. Because of the effectiveness of brine, less chlorides reach the storm water system. Further, the use of brine significantly lessens the damage to concrete and asphalt surfaces relative to rock salt. While not being bound to theory, it is believed that brine reduces the number of freeze/thaw cycles relative to rock salt that can be destructive to concrete and asphalt. As such, the use of brine as a pretreatment and after a snow event are beneficial to the surface being treated and the environment relative to the use of rock salt.

SUMMARY

An aspect of the present disclosure relates to a method of operating a deicing system remotely, including connecting a control for the deicing system with the deicing system. When the control and the deicing system are connected, the method includes providing functionality for controlling operation of the deicing system, including control of application rates, and managing workflow and operation including job tracking.

Connecting a control for the deicing system includes connecting via a wireless connection. Providing control of application rates includes automatic control of application rates by determining one or more of a speed of travel of the deicing system, a desired spray width (including which boom sections are active), and a user-set application rate, and applying deicing fluid to a job site at a predetermined area rate based on the one or more of the speed of travel of the deicing system, the desired spray width (including which boom sections are active), and the user-set application rate. Applying deicing fluid is modified by a user selecting an ice buster application rate manually for a section of the job site. Providing control of application rates includes manual control of application rates by determining a speed of travel of the deicing system, and applying deicing fluid to a job site at a user-defined flow rate, wherein applying comprises applying at the user-defined flow rate adjusted by a speed of travel of the deicing system (as well as, optionally, the desired spray width and/or the user-set application rate) to provide a desired area rate application of the deicing fluid. Providing functionality for controlling operation mode includes receiving a manual or automatic application of deicing fluid based on a flow rate or area rate of application, and applying at the flow rate adjusted by a speed of travel of the deicing system for manual operation, or applying at the area rate adjusted by a speed of travel of the deicing system for automatic operation.

A speed of travel of the deicing system is determined by a global positioning system receiver. Providing functionality for controlling operation further includes providing control of operation of a boom system of the deicing system. Providing functionality for controlling operation further includes providing control of an engine of the deicing system, including start and stop of the engine, and choke and throttle control. Providing functionality for controlling operation further includes providing control of lights and strobes of the deicing system. Providing functionality for controlling operation further includes providing control of a hose reel rewinder of the deicing system.

Managing workflow further includes tracking each individual job of the deicing system. Tracking each individual job further includes tracking data for deicing fluid usage, hose reel usage, temperature, deicing system travel speed, deicing fluid average application rate, and coverage area. Managing workflow further includes preparing a report for each individual job, including the tracked data, and providing a reporting operation for mobile reporting of a job via wireless communication. Managing workflow further includes tracking all jobs for a defined event, tracking all jobs for a defined season, and providing a report capability for the defined event, the defined season, or both the defined event and defined season. Providing functionality for control of the deicing system further includes tracking lifetime operation of the system for maintenance purposes.

Another aspect of the present disclosure relates to a non-transitory computer-readable storage medium including instructions that cause a computer to connect a control for the deicing system with the deicing system. Once connected, the non-transitory computer-readable storage medium provides functionality for controlling operation of the deicing system, including control of application rates, and manages workflow and operation including job tracking.

The non-transitory computer-readable storage medium instructions further cause the computer to provide automatic control of application rates by determining a speed of travel of the deicing system and application spray width, and applying deicing fluid to a job site at a predetermined area rate based on a speed of travel of the deicing system. The non-transitory computer-readable storage medium instructions further cause the computer to provide manual control of application rates by determining a speed of travel of the deicing system and application spray width; and applying deicing fluid to a job site at a user-defined flow rate, wherein applying comprises applying at the user-defined flow rate adjusted by a speed of travel of the deicing system to provide a desired area rate application of the deicing fluid.

In another aspect of the present disclosure, a mobile application for control of a deicing system includes providing functionality to control functions of the deicing system. The functionality includes but is not limited to controlling application rate of deicing fluid based upon travel speed of the vehicle; monitoring deicing fluid tank level; controlling lights and strobes on the deicing system; controlling start/stop, choke, and throttle position on a power unit of the deicing system remotely; rewinding a hose reel of the deicing system; tracking jobs, overall system usage, hose reel usage, temperature, travel speed of the deicing system, and average application rate of the deicing system; and sending reports with details of performed deicing jobs including job details remotely.

The mobile application provides functionality to send reports as files to email addresses. The mobile application provides functionality to integrate reports into billing systems without the need for paper tracking.

DETAILED DESCRIPTION

Embodiments of the present disclosure provide a tool for control and operation of de-icing systems, such as prime mover mounted deicing and/or snow removal system, including those with booms. Embodiments of the present disclosure further provide a graphical user interface and mobile application for control and operation of de-icing systems. In embodiments described herein, the tool is configured to interface with one or more controller units on a de-icing system to receive input from or output data to the tool.

Figure 1:
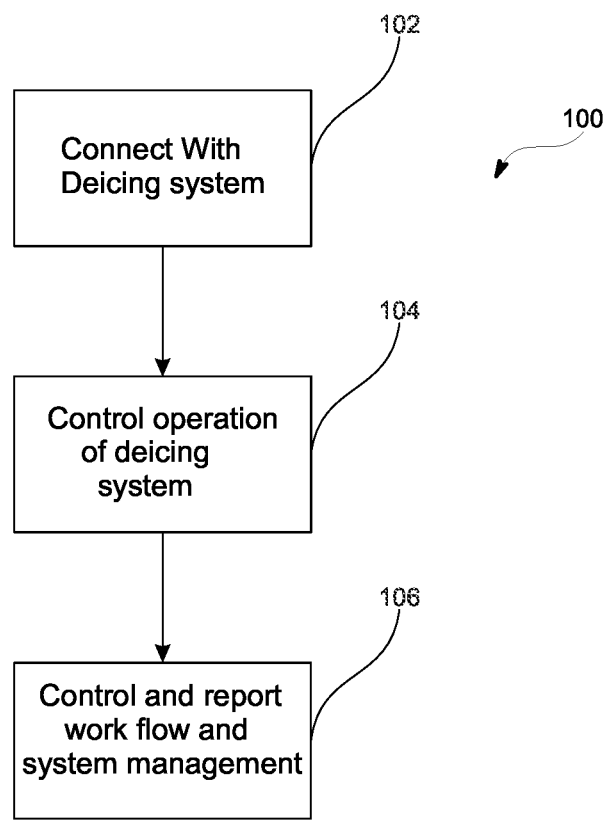
FIG. 1 is a flow chart diagram of a method according to an embodiment of the present disclosure.

In one embodiment, a method 100 for operation and workflow management of a de-icing system is shown in flow chart form in FIG. 1. Method 100 comprises connecting with a deicing system in block 102, and controlling operation thereof, including control of lights and strobes, operation mode, application rates, boom control, and the like in block 104. Further, operation and workflow management include deicing system startup and engine control; system settings control; and job tracking, storage, and reporting in block 106. Once the application is connected a first time, it will remember the credentials, and block 102 may be skipped for the next operations.

Connection of a tool, such as but not limited to a mobile application capable of operation on a computer, mobile phone, tablet, mobile computer, or the like, to a deicing system allows control thereof without an operator being subjected to harsh conditions. In one embodiment, connection of the deicing system to the control tool (e.g., mobile application) is by wireless connection, for example, Bluetooth®. In one embodiment, a deicing system is controlled by the application allows a user to control a number of deicing system functions. For example, a user can perform functions including:

control application rate of deicing materials based upon travel speed of the vehicle;
monitor tank level of deicing materials;
control lights and strobes on the deicing unit;
start and stop, control choke, and control throttle position on a power unit of the deicing system remotely;
rewind a hose reel of the deicing system remotely;

track jobs, overall usage, hose reel usage, temperature, speed, average application rate, and total usage of the deicing system; and send report files (e.g., files in comma separated value (CSV) format) to email addresses or to a billing system without the need for paper tracking.

Wireless control of a deicing system also allows a system to be completely separated from an application vehicle, since the system is not hardwired to the prime mover (e.g., vehicle), and since transmission of data occurs over a wireless connection.

Representative screens and operation and control of a deicing system are shown in FIGS. 2-15, and described below.

Figure 2:
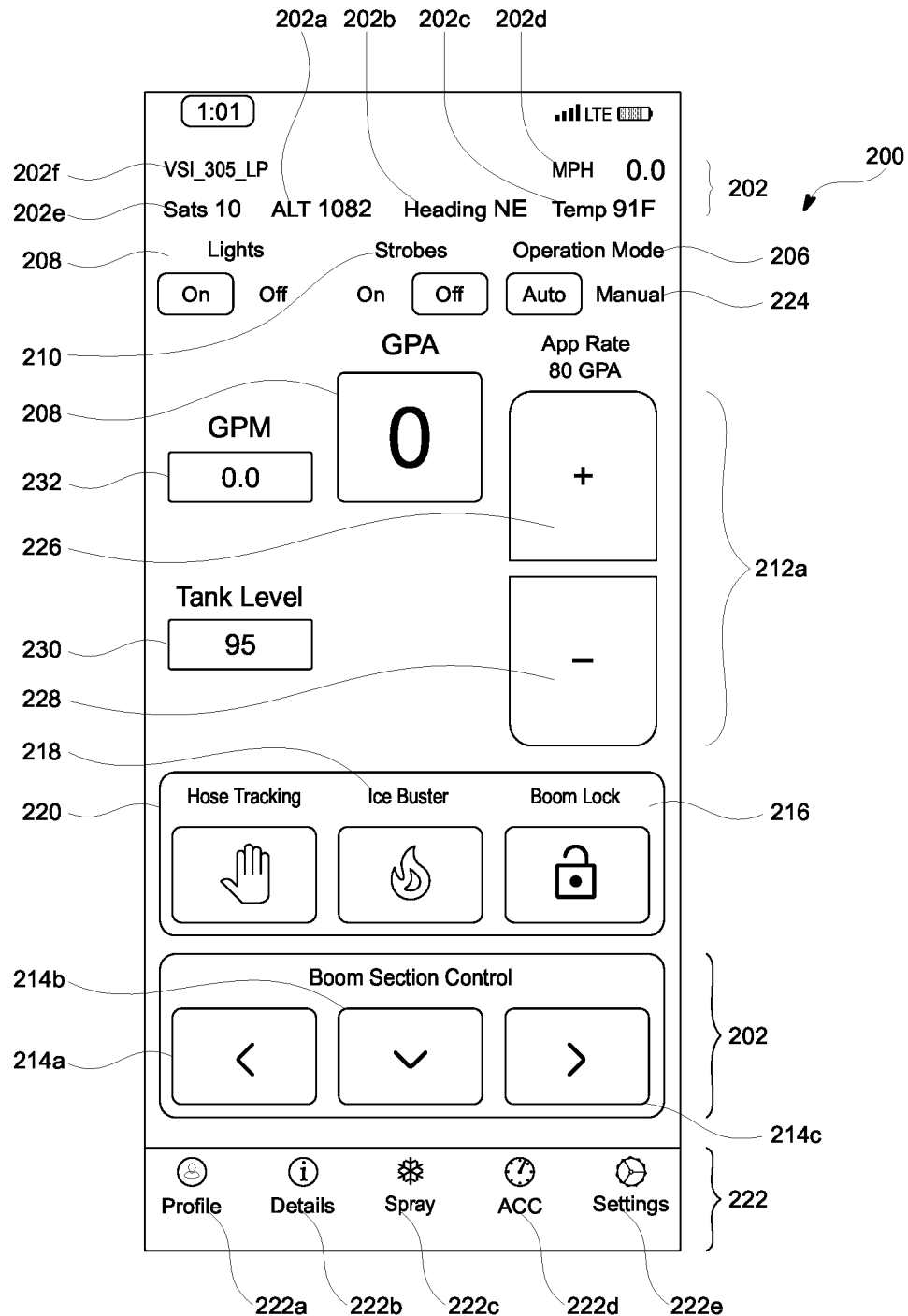
FIG. 2 is a representative screen shot of an automatic spray option control screen presentation and function according to an embodiment of the present disclosure.
Figure 3:
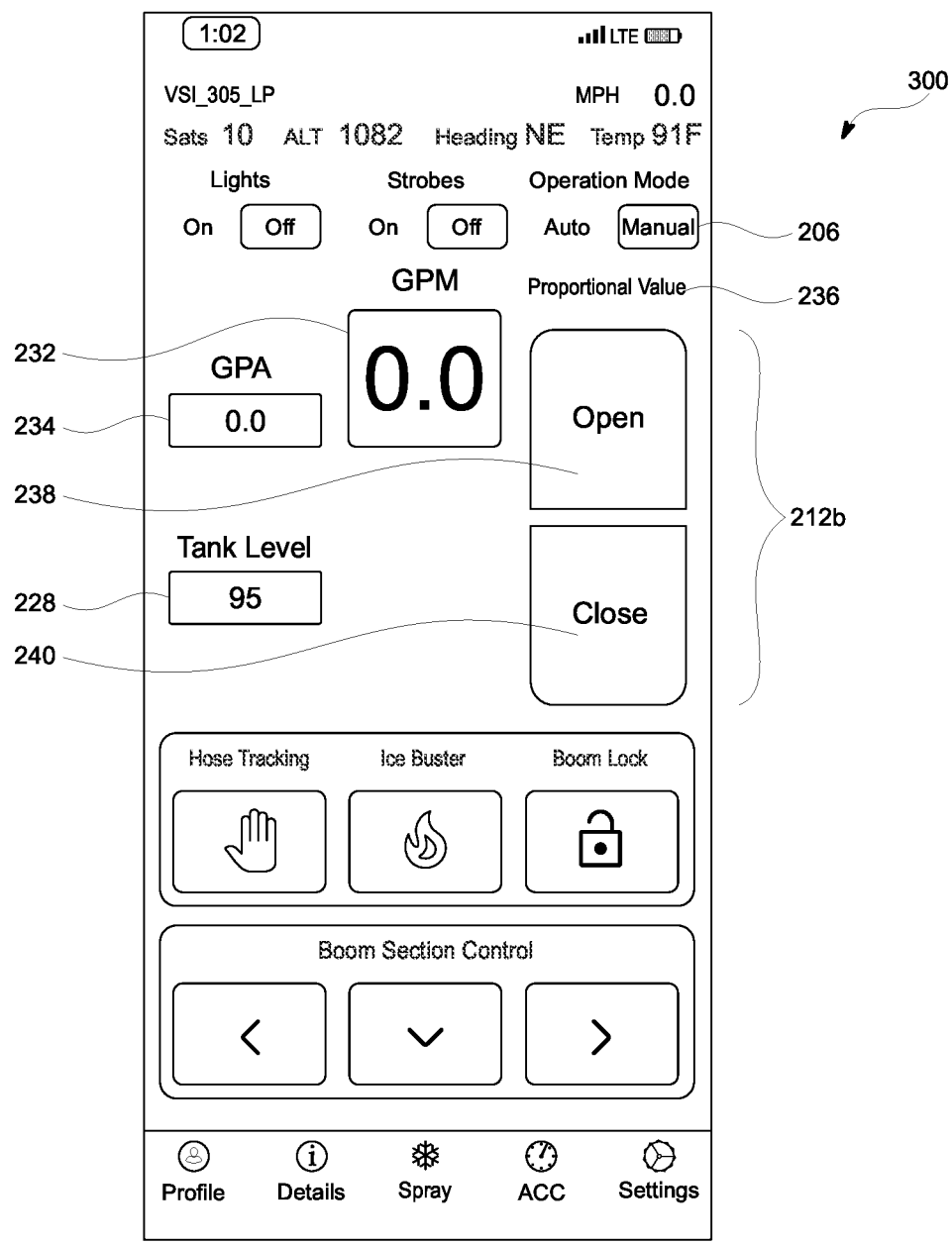
FIG. 3 is a representative screen shot of a manual operation spray option control screen presentation and function according to an embodiment of the present disclosure.
Figure 4:
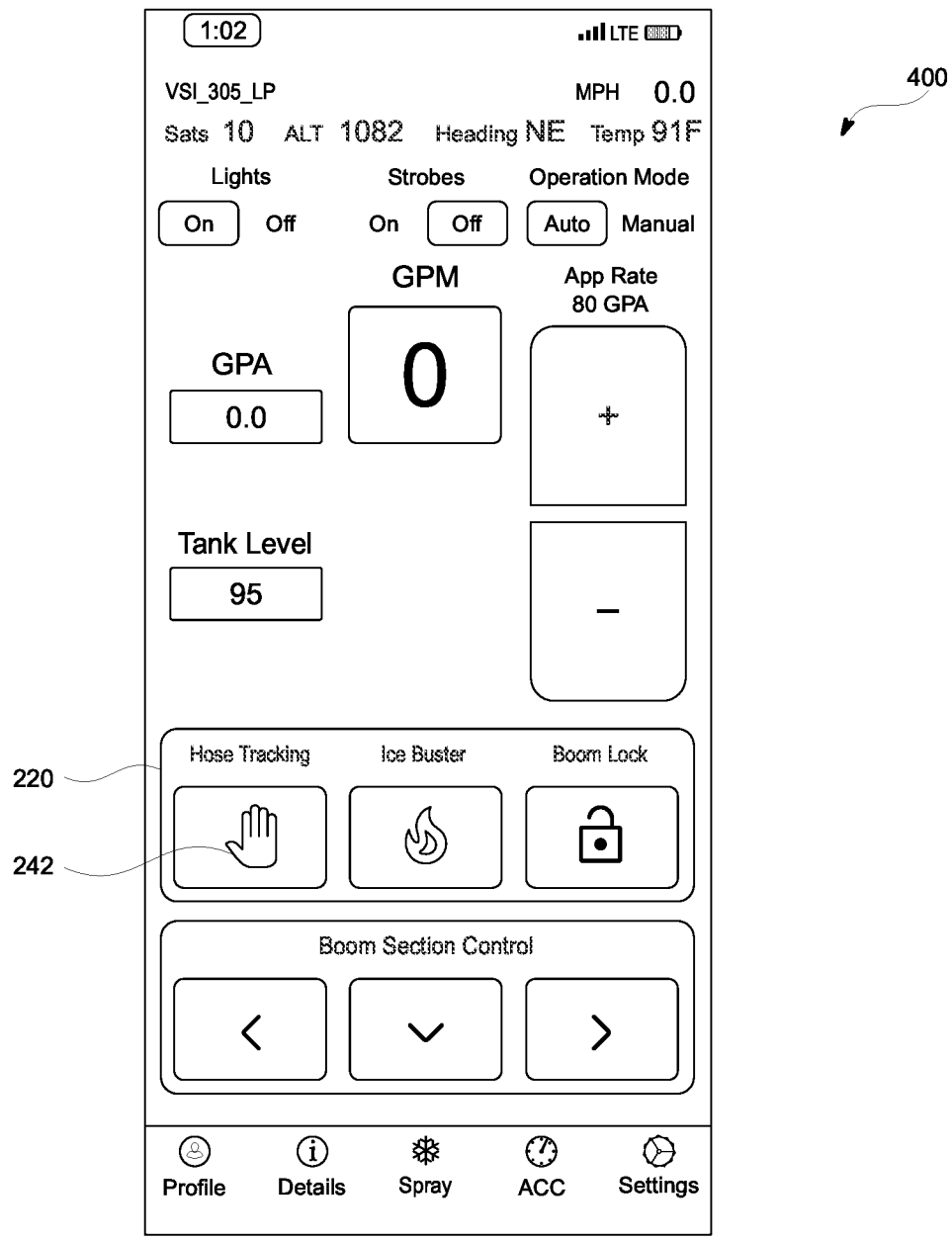
FIG. 4 is a representative screen shot of a hose tracking selection and operation function according to an embodiment of the present disclosure.

FIG. 2 shows a representative graphical user interface (GUI) screen 200 of a control application for a deicing system. While the GUI screen 200 is shown as a mobile phone screen, it should be understood that the screen may be that of a tablet, a laptop, or other computer without departing from the scope of the disclosure. Screen 200 includes an information section 202 for display of information regarding the location and movement of the deicing system. This may be gathered in one embodiment by global positioning system (GPS) information. Information section 202 includes in one embodiment displays showing altitude 202a, heading 202b, external temperature 202c, speed 202d, number of satellites connected 202e, and deicing system identification 202f.

Operation mode selection is at 204. Operation modes include in one embodiment automatic and manual operation as shown at 206, and control of system lights at 208 and strobes at 210. At 212a, functions of automatic mode are shown in FIG. 1. Manual mode functions are shown at section 212b in FIG. 2. Boom controls are at 214. Boom lock 216, ice buster 218, and hose tracking operations are shown as well. In one embodiment, different screens featuring different operations and controls are selected at section 222. Selections include, in one embodiment, profile at 222a, details at 222b, spray control at 222c (the screen of FIG. 1), accessories at 222d, and setting at 222e. At screen selection section 222 on GUI screen 200, different screens may be selected. Spray screen selection 222c of GUI screen 200 is shown in FIG. 2. Each section and control is described further below.

At 212, automatic mode for deicing is shown. Automatic deicing uses information from GPS to control an application rate of deicing materials. Based on GPS, a speed of the prime mover (indicated at 202d) is determined. Further, boom size and spray width may also be considered in determining the flow rate generated by the system. The system uses, in one embodiment, the travel speed of the prime mover, desired spray width (including which boom sections are active) and a user-set application rate to determine the flow rate that is to be achieved. A gallons per acre (GPA) application rate shown at 224 is used in automatic application mode. The general GPA application rate is set in settings (described further below). The speed of the vehicle combined with the set application rate 224 allows the control tool to determine the gallons per minute (GPM) 232 to be applied to satisfy the GPA for the given speed. The tool communicates with the deicing system to adjust the GPM to keep the GPA at its set rate. Should the user desire the application rate to be increased or decreased, even during automatic mode, buttons 226 (increase rate) and 228 (decrease rate) may be used. A tank level indicator 230 shows the supply of deicing material in the onboard tank, in this embodiment in gallons left.

GUI screen 200 also includes boom section control 214. As shown at 214, boom section control includes control buttons for left 214a, middle 214b, and right 214c booms. Selecting any of the booms allows control of that particular boom. While three booms are indicated, the number of booms is not limited to three. It should be understood that a smaller or a larger number of booms may be provided on a system, and control of all booms of the system is contemplated and is within the scope of the disclosure.

GUI screen 200 further includes boom lock 216, ice buster 218, and hose tracking 220 selections. Selecting boom lock allows locking of all or individual booms for travel or non-deicing situations. When a boom is locked, no spraying occurs from that boom.

Ice buster 218 is a term used for an application rate of deicing materials at a different, usually higher, application rate or coverage. An ice buster application rate may be used when a particular section or portion of the area to be deiced is particularly icy, or requires additional deicing. A selection of ice buster 218 changes the application rate to a preset ice busting GPA in automatic mode. For example, when a user identifies a more icy section, the ice buster selection 218 may be made. This changes the application rate to the preset ice buster rate. When the icy spot is finished, selecting ice buster 218 again resets the application rate to the automatic rate indicated at 224. When in ice buster mode, the system will also automatically bring the engine to wide open throttle (WOT), or the 100% throttle setting, in order to provide adequate power and response to accommodate the increased spray volume in ice buster mode. Once the ice buster mode is deactivated, the system will return the throttle setting to its previously user set position.

Hose tracking 220, when enabled, tracks deicing product being sprayed from a hose sprayer only, not from spray booms. When hose tracking is selected, boom control at 214 is unavailable. When sprayer operation is finished, pressing the hose tracking selection 220 releases boom control and stops tracking only the hose sprayer. When hose tracking is enabled, as shown in GUI screen 400 of FIG. 4, a hose tracking symbol 242 lights up in one embodiment to indicate that hose tracking is enabled. Also, boom section control may be seen in screen 400 to be grayed out, as boom section control is disabled when hose tracking is selected.

All applications, in terms of number of gallons and other statistics, are saved in the application, as will be described further below. Further, reports on any particular job, event, season, or the like may be generated from identified jobs and the like, as will be described further below.

When manual operation mode is selected using selection option 206, manual operation of the deicing system is enabled. Manual operation options are shown at 212b of GUI screen 300 of FIG. 3. In manual operation, GPM 232 is used as the selection criteria for deicing. A proportional valve indicator 236 is provided. Selecting open (238) or close (240) opens or closes, respectively, a proportional valve on the deicing system to adjust GPM flow. With the selected GPM, the application displays determined GPA 234. While a proportional valve is indicated, it should be understood that any type of valve or system that allows regulation of flow is amenable to use with the disclosure. For example only and not by way of limitation, other such valves or systems include pressure relief systems, bypass systems, different valves, and the like. As with automatic mode, tank level indicator 240 also shows. Ice buster, hose tracking, boom lock, and boom section control are also all available in manual mode.

Figure 5:
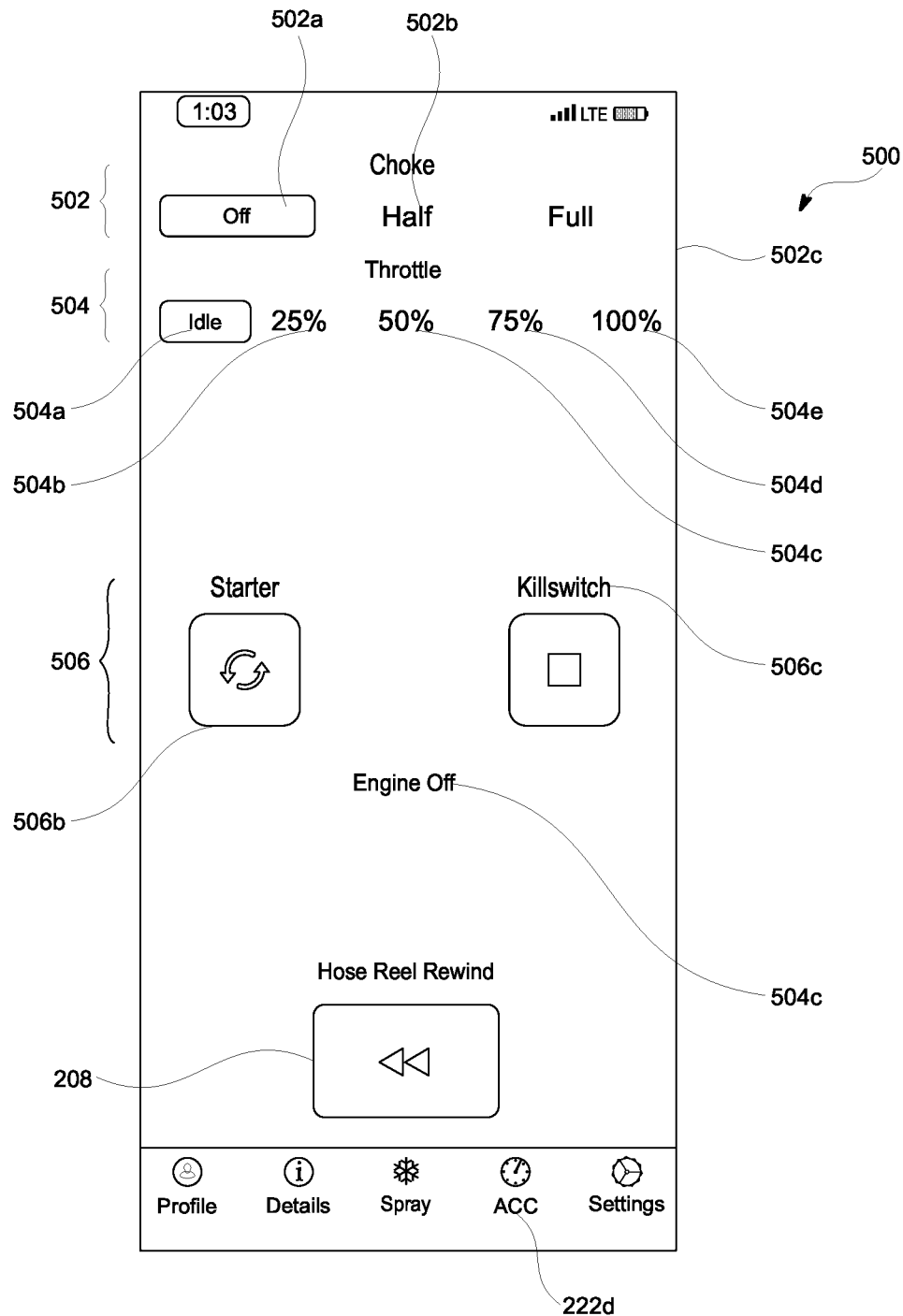
FIG. 5 is a representative screen shot of an accessory and engine control presentation and operation according to an embodiment of the present disclosure.

When a user selects the accessories screen at 222*d* of section 222, GUI screen 500 as shown in FIG. 5 is presented. Accessories screen 500 provides options for control of the engine and hose reel of the selected deicing system. Choke control is shown at section 502, and includes selections for choke off 502*a*, half choke 502*b*, and full choke 502*c*. Throttle control is shown at section 504, and includes selections for idle 504*a*, 25% throttle 504*b*, 50% throttle 504*c*, 75% throttle 504*d*, and 100% throttle 504*e*. While set throttle positions are shown, it should be understood that throttle control may be performed in other ways, and with fine tuning, such as but not limited to a slider throttle control allowing nearly infinite throttle positions, without departing from the scope of the disclosure. Section 506 includes selections for starting and stopping the engine. Current engine status is shown at 506*a*. Starter button 506*b* allows starting of the engine, and killswitch 506*c* shuts the engine off. Accessories screen 500 further includes a hose reel rewind selection 508. When selected, an extended hose reel, such as that for a sprayer hose stored on a hose reel, is rewound automatically onto the hose reel.

Figure 6:
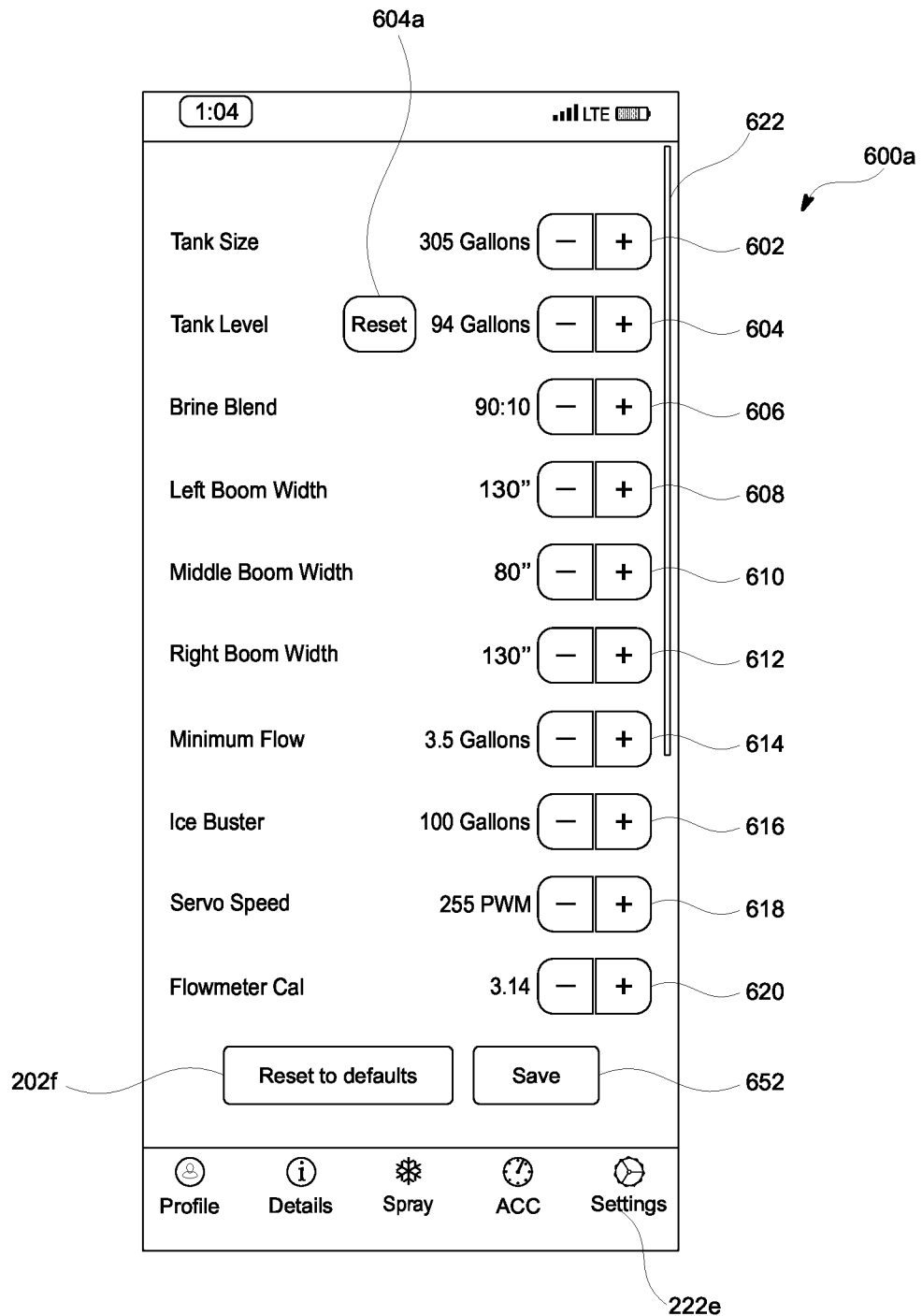
FIG. 6 is a representative screen shot of a first page of a settings selection and operation screen according to an embodiment of the present disclosure.
Figure 7:
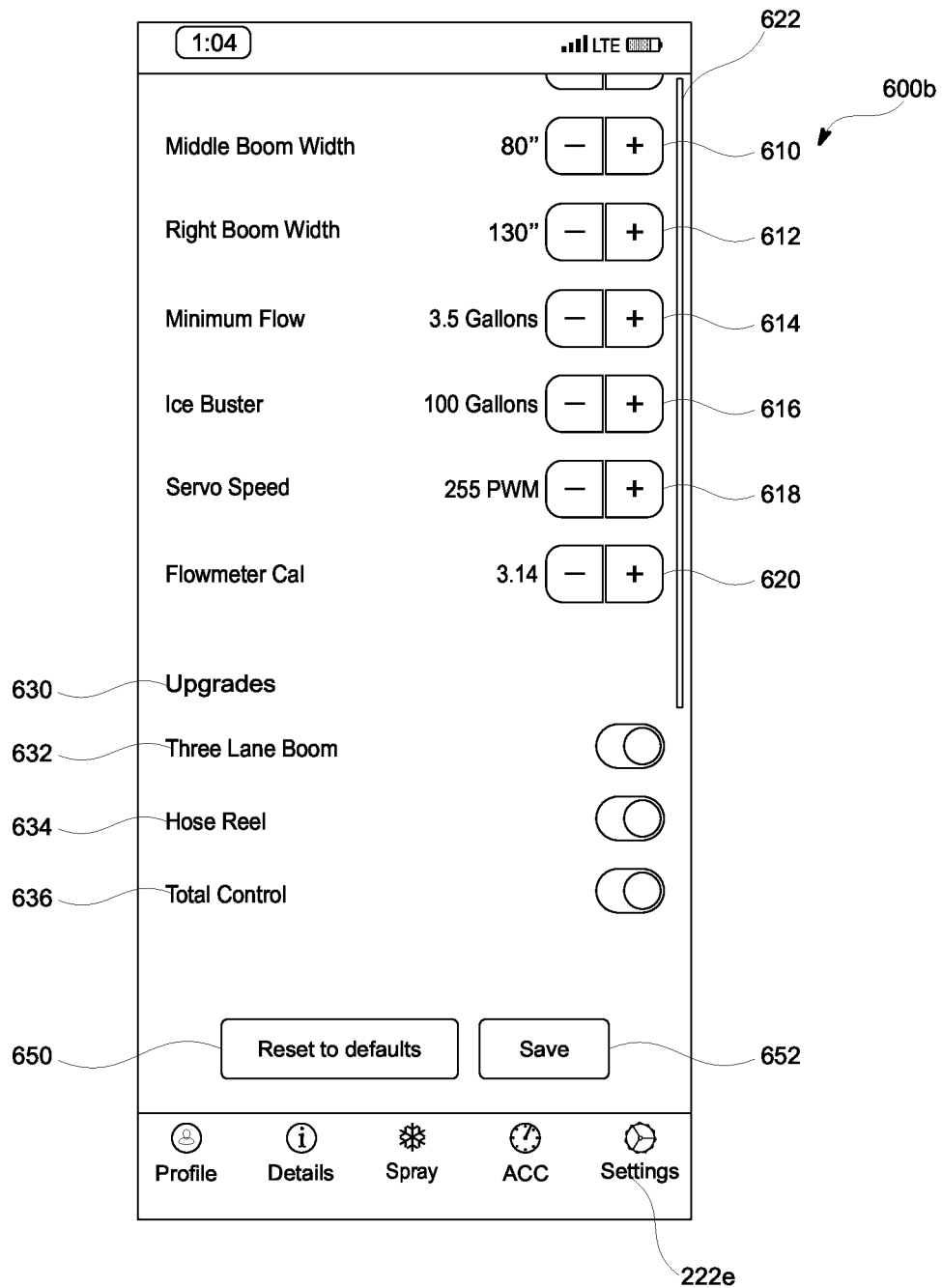
FIG. 7 is a representative screen shot of a second page of a settings selection and operation screen, and an upgrades presentation according to an embodiment of the present disclosure.

When a user selects the settings screen at 222*e* of section 222, GUI screen 600*a* as shown in FIG. 6 is presented. Scrolling down within screen 600*a* presents further settings as shown on GUI screen 600*b* of FIG. 7. GUI screen 600*a* shows settings for a number of functions of the deicing system. While a representative set of settings is shown in FIGS. 6 and 7, it should be understood that different deicing units may have different settings without departing from the scope of the disclosure. Settings shown in FIG. 6 include tank size 602; tank level 604; brine blend 606; left, middle, and right boom widths 608, 610, and 612; minimum flow rate 514, ice buster application rate in GPA 616; servo speed 618; and flowmeter calibration 620. Each of the settings is typically preset at the factory of manufacture of the deicing machine, and are generally at the suggested manufacturer settings. However, selection buttons for each of the settings allows for adjustment of the parameters. Tank size 602 is shown at 602. Current tank level is shown at 604. A reset button 604*a* allows for resetting the tank level to the tank size as indicated at 602. If a partial filling of the tank is made, the adjustment buttons at 604 allow for setting the current tank level in gallons. Tank level determinations may be made manually and entered into the system control, or may be determined automatically by sensor or the like, and conveyed to the control system via the wireless connection thereto. In such a configuration, the system is automatically updated with tank level.

Further settings visible after scrolling using scroll bar 622 are shown in screen 600*b* of FIG. 7. The further settings include upgrades 630. A representative set of upgrades is shown, including three lane boom 632, hose reel 634, and total control 636. More or fewer upgrades 630, or different upgrades 630, may be present on different deicing systems.

Figure 8:
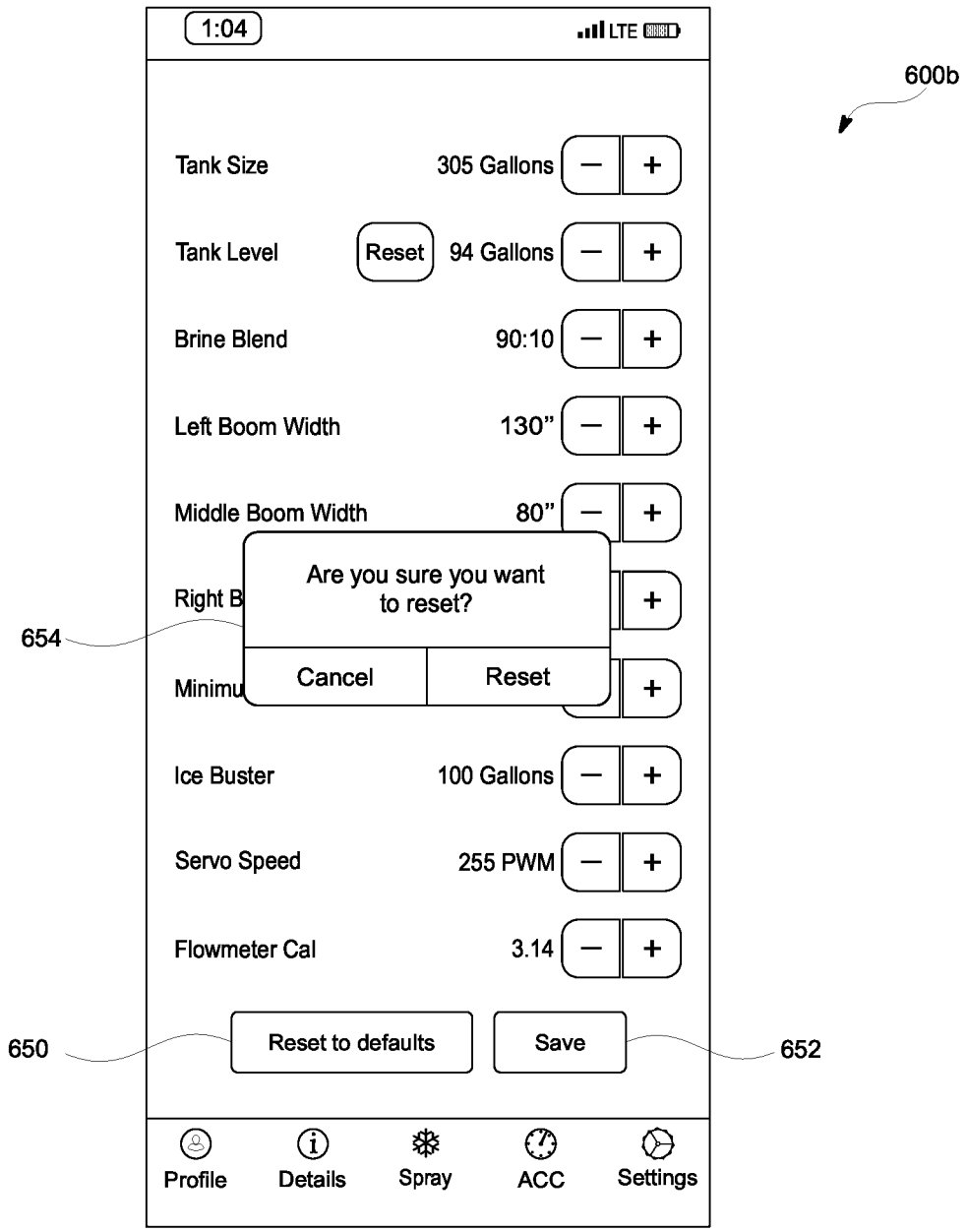
FIG. 8 is a representative screen shot of a reset confirmation for a settings page such as that shown in FIGS. 6 and 7.

If a user changes any of the settings as shown in FIGS. 6 and 7, a save option at 652 (available on all settings screens) is selected, and the current settings are saved. Should a user wish to reset the entirety of the settings to their factory default settings, button 650 (available on all settings screens) may be selected. Selection of this options restores the factory settings. A confirmation options 654 for resetting to factory defaults is shown in FIG. 8.

Figure 9:
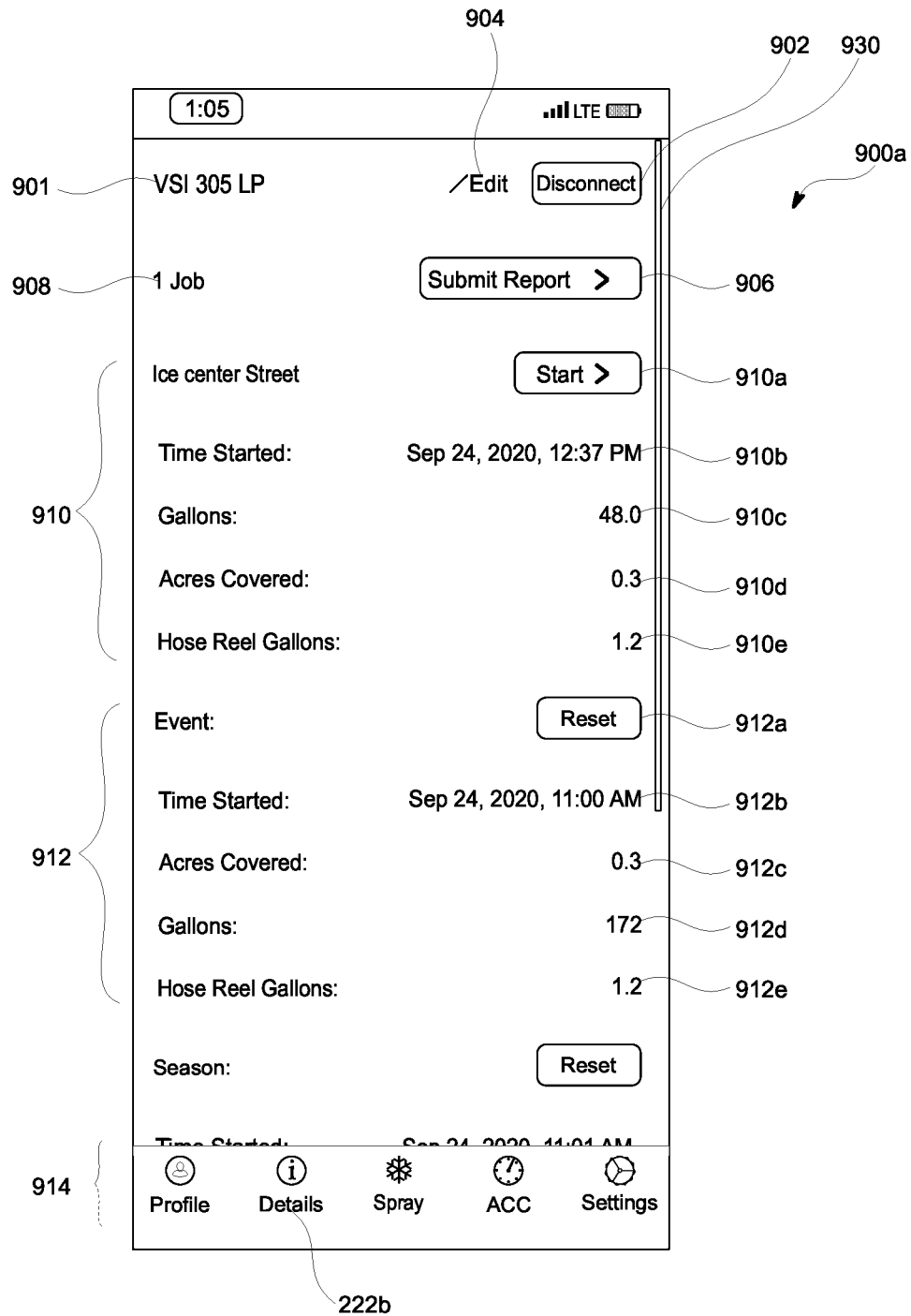
FIG. 9 is a representative screen shot of a first page of a detail's selection and operation screen presentation according to an embodiment of the present disclosure.

When a user selects the details screen at 222*b*, GUI screen 900*a* as shown in FIG. 9 is presented. Scrolling down within screen 900*a* with scroll bar 930 presents further settings as shown on GUI screen 900*b* of FIG. 10. The details menu allows tracking of all deicing jobs. GUI screen 900*a* shows information on the current deicing system connected to the control tool at 901. The application can disconnect from and connect to a deicing system via wireless link. The disconnect button is shown at 902. When no deicing machine is connected, a connect button is shown. An edit button 904 allows for editing the deicing system name.

Job tracking allows tracking of all details for each performed or saved job, and report creation for billing purposes. The number of jobs tracked is shown at 908. In the representative screen, a single job has been tracked. The submit report option at 906 allows for submission of all tracked jobs. Details of submission are described below with respect to FIG. 13.

The current job details are shown in section 910. Event details, such as for a particular snowstorm, ice event, day, week, or the like, are shown at section 912. Season details are shown at section 914 (see FIG. 10 for more season detail section 914). To create a job, or to start an existing pre-programmed job, a user selects the start button 910*a*. Pressing start 910*a* at the start of a job brings up GUI screen 900*c* of FIG. 11, showing a job name entry screen 918. A keypad entry is shown at 920. The job name may be entered, and when correct, the user selects the start option on the popup 918. The name of the job then appears in section 910. Details of the job are tracked and shown in section 910.

Figure 12:
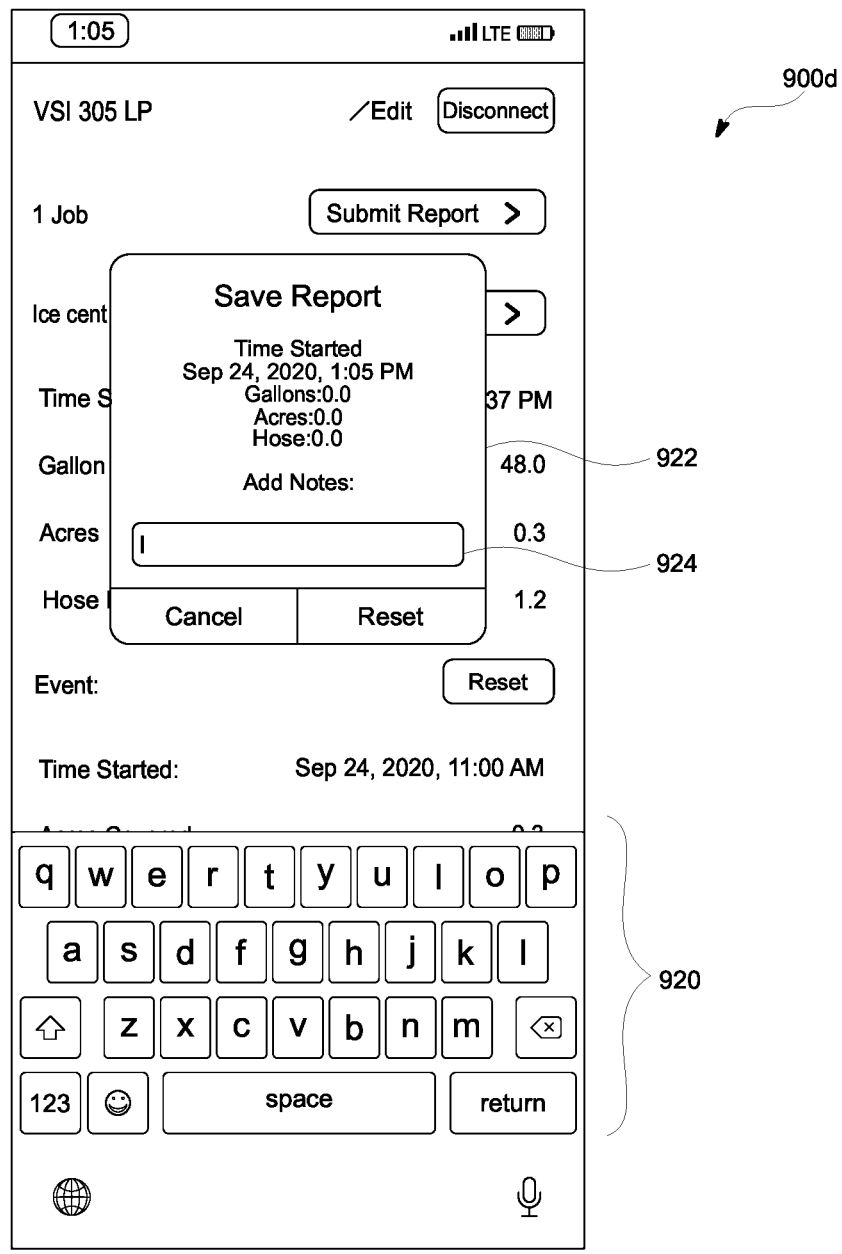
FIG. 12 is a representative screen shot of a host view of a report save page according to an embodiment of the present disclosure.

Job details shown as representative include start time 910*b*, gallons applied at 910*c*, acres covered at 910*d*, and hose reel gallons of material used at 910*e*. When a job is started, the start button 910 turns to a stop button (not shown). When a job is completed, the stop button is selected, and the option to save is shown. The GUI screen 900*d* of FIG. 12 shows the save job screen popup 922. A keypad entry is shown at 920. All details of the job are saved for later reporting. An option to add notes to the job report is provided at 924, so that further information about the job may be recorded and saved.

Section 912 provides details for all actions performed during a particular event. This may be a single storm, a day, a shift, or the like. Details include a reset button 912*a* to reset the event details, and further include start time 912*b*, acres covered at 912*c*, gallons applied at 912*d*, and hose reel gallons of material used at 912*e*.

Figure 10:
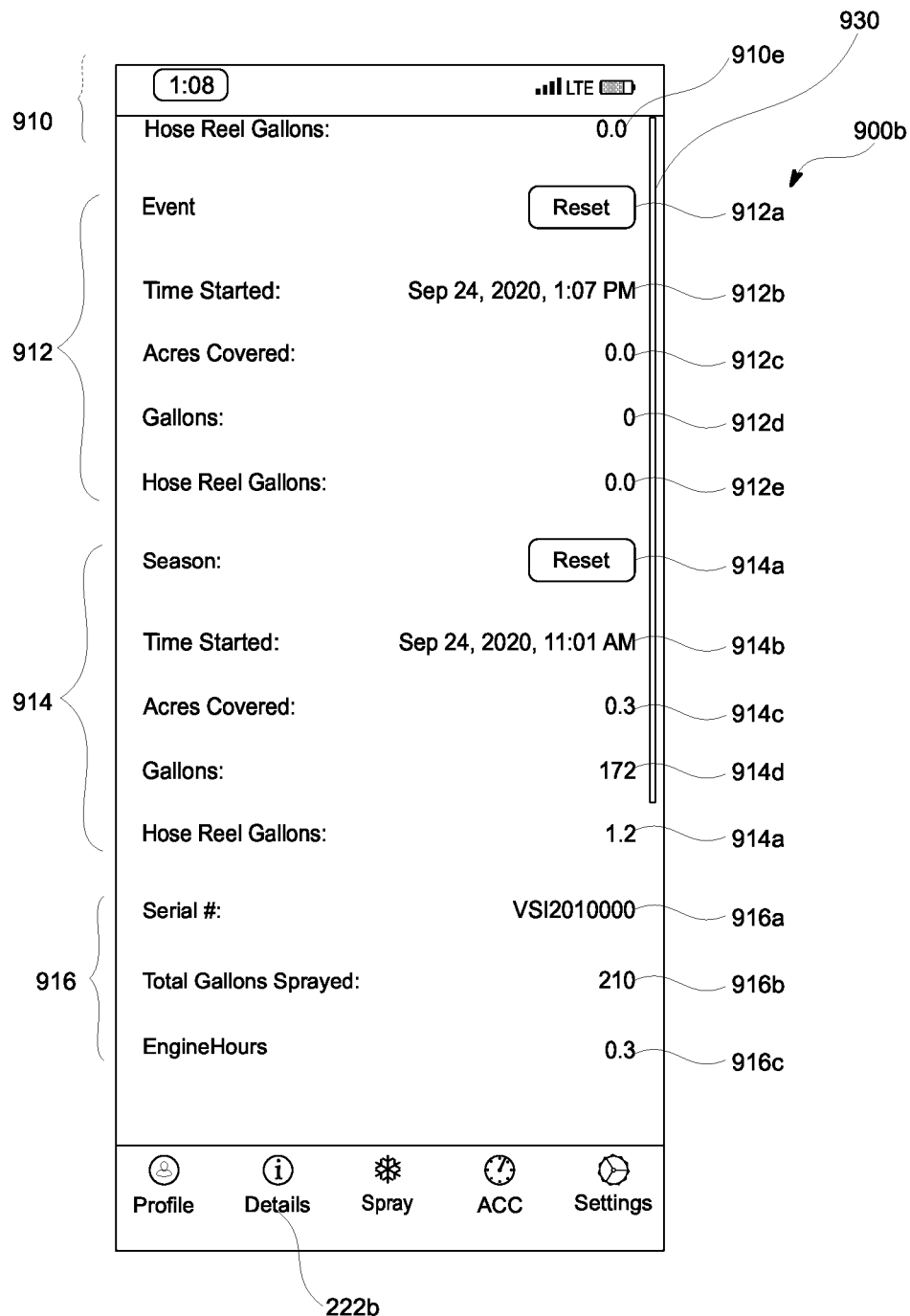
FIG. 10 is a representative screen shot of a second page of a detail's selection and operation screen presentation according to an embodiment of the present disclosure.
Figure 11:
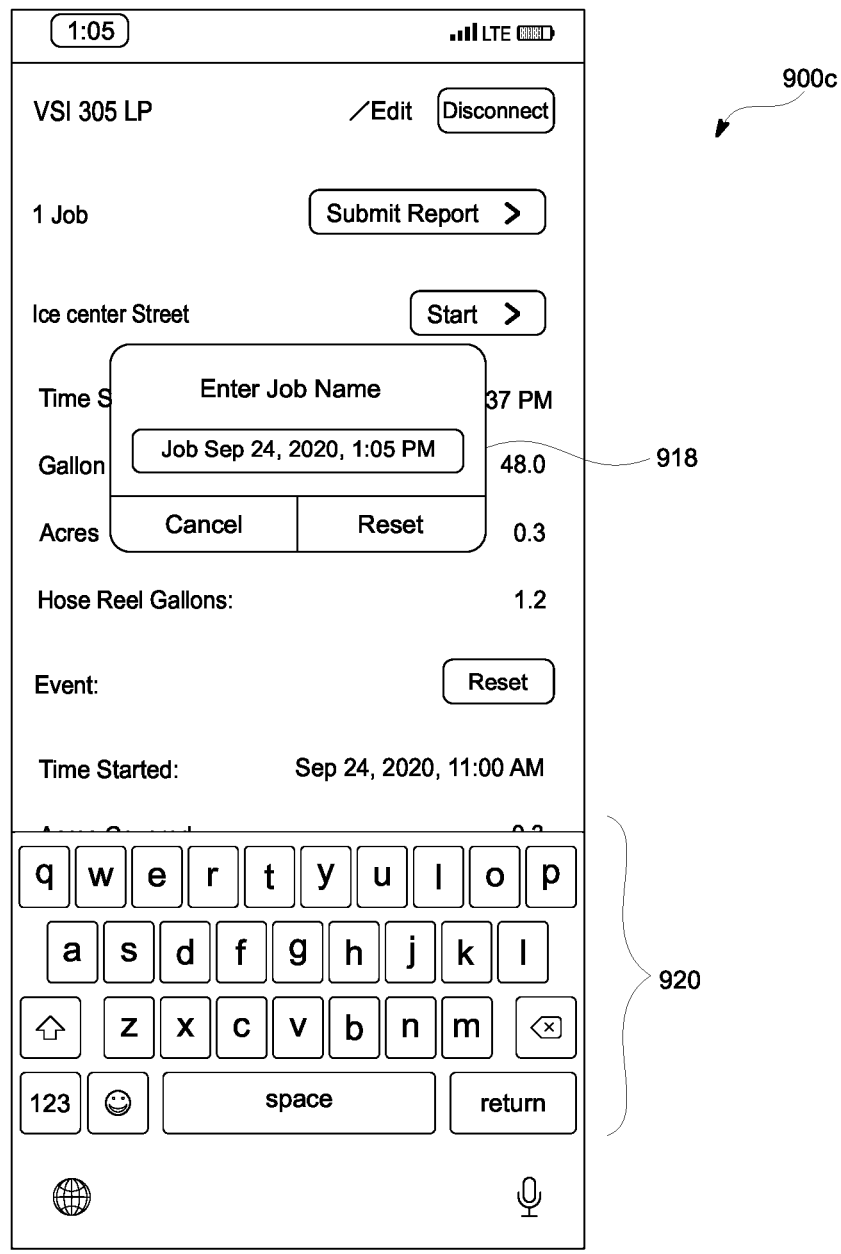
FIG. 11 is a representative screen shot of a job name entry page according to an embodiment of the present disclosure.

Section 914, seen more clearly at GUI screen 900*b* of FIG. 10, includes season details. A season may be a full deicing season, a month, or other period determined by the user. Season details include a reset button 914*a* to reset the event details, and further include start time 914*b*, acres covered at 914*c*, gallons applied at 914*d*, and hose reel gallons of material used at 914*e*. Season details may assist with planning. For example, end of season stats may help a deicing company determine utilization of assets, such as seeing that smaller prime movers are used more often and for more total hours, whereas larger prime movers are utilized less often but for more applied gallons.

Section 916 includes details about the particular selected deicing system. Section 916 includes, in one embodiment, a serial number 916*a* for the selected deicing system, a total lifetime gallons sprayed count 916*b*, and a total number of operating hours for the engine at 916*c*. Engine hours may be used to determine when engine service is needed, such as oil changes or other routine maintenance that are based largely on hours of operation.

Data available to the control application is based with the unit. That is, all information is stored with the deicing system, and is accessible to the control application no matter what user is connected thereto. Therefore, tracking of jobs and utilization is maintained for each unit.

Figure 13:
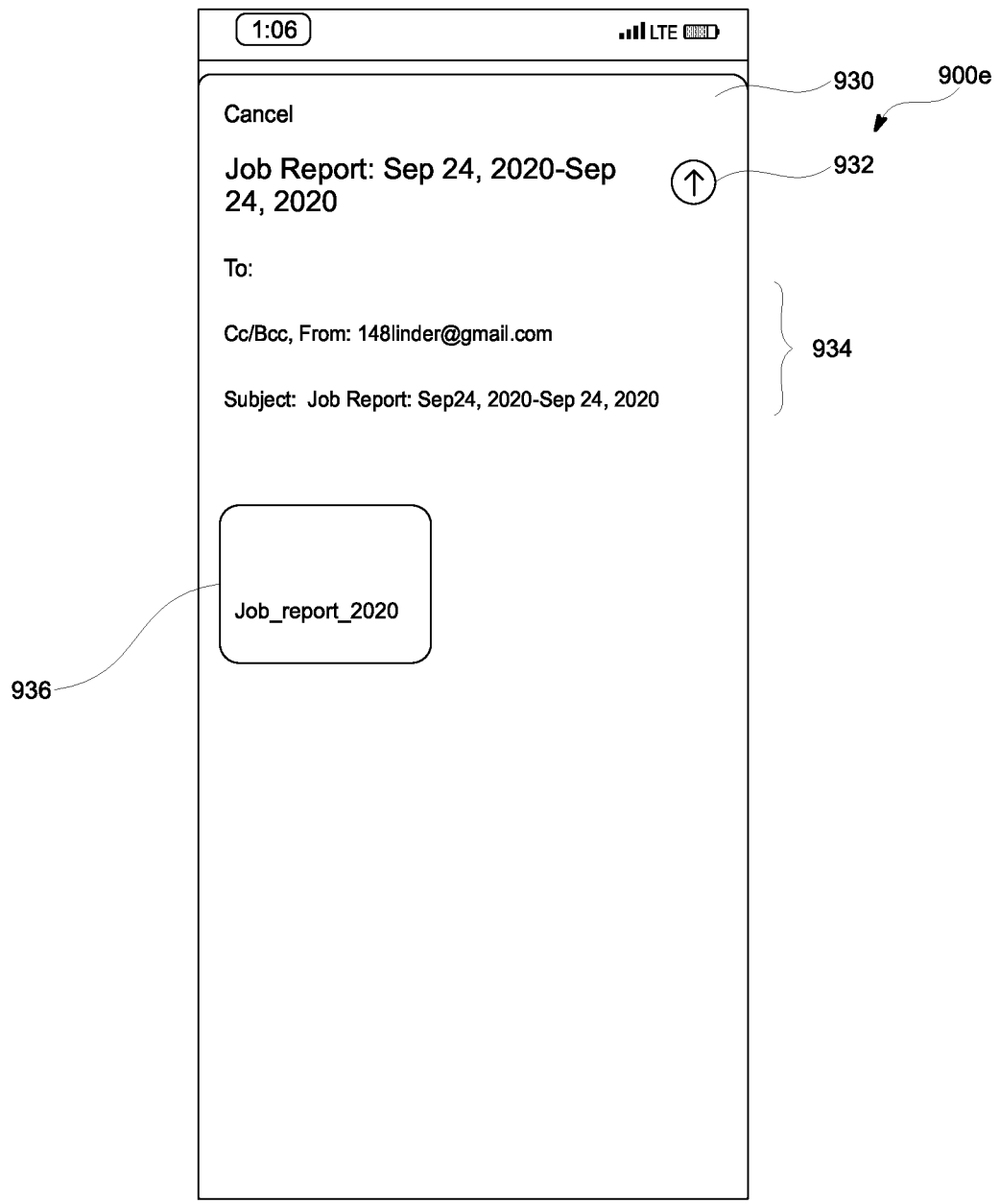
FIG. 13 is a representative screen shot of a report submit page according to an embodiment of the present disclosure.

Each new job started will add to the job count at 908. When all jobs for the shift/day are completed, the user can submit a report which will submit reports for all jobs. The submit report screen 900e is shown in FIG. 13. When a user selects the submit report option 906, the popup shown in FIG. 13 appears. This is an email form in one embodiment. In the generated report 936, all data for each job submitted is included. Details in the report include, for example only and not by way of limitation, how much product was sprayed, the coordinates where product was sprayed, time, job name, notes, and other details. The email in one embodiment includes a title 930, an upload/send option 932, and to/from information 934.

Figure 14:
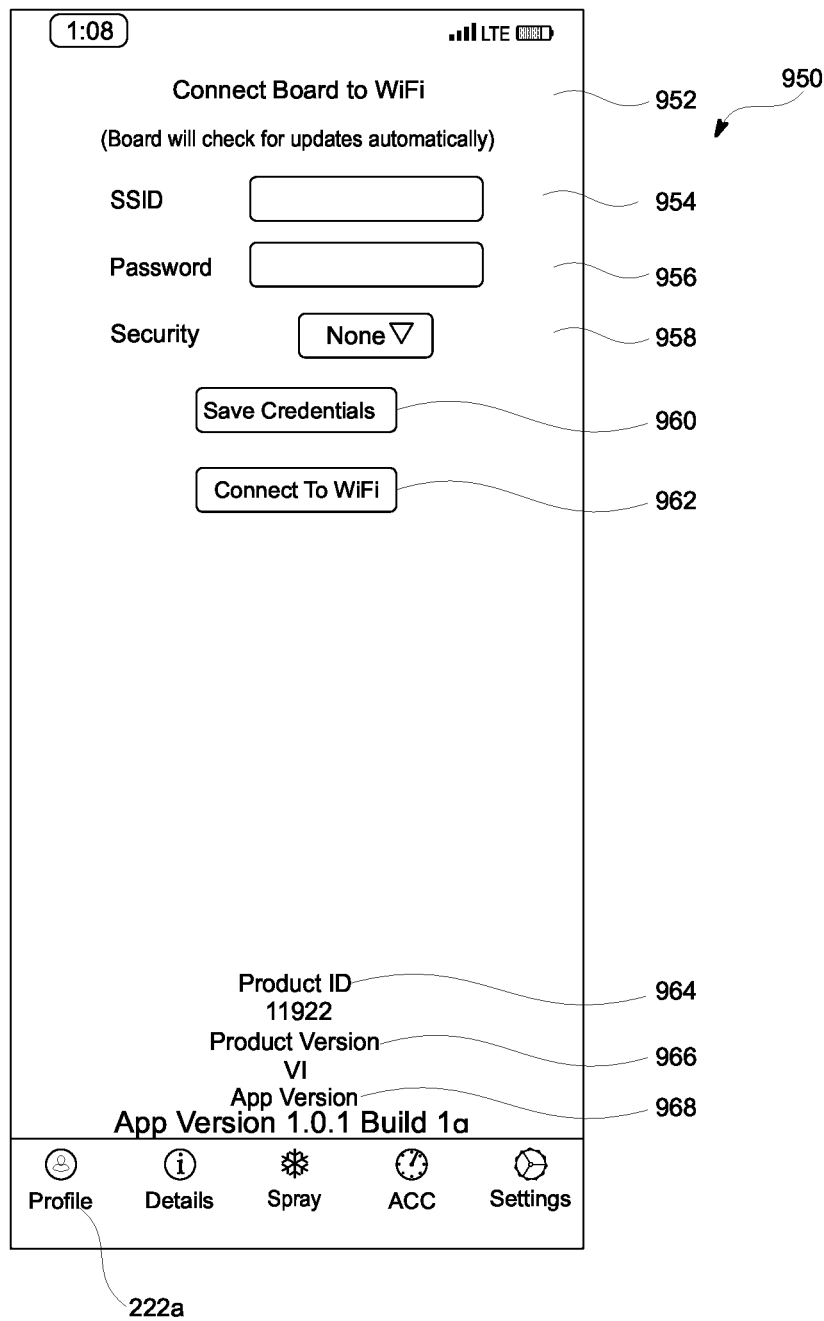
FIG. 14 is a representative view of a profile, update, and connection page according to an embodiment of the present disclosure.

Deicing systems such as those used with the control application herein have updateable circuit boards in one embodiment. Circuit boards and associated programming, for example that saved in memory, application specific integrated circuits, programmable read only memories, and the like may be updated using options available in the in the profile section 222a. Profile section 222a, when selected, brings up GUI screen 950 as shown in FIG. 14. The circuit board/boards in the selected deicing system are updateable over a wireless connection. When selecting connect board to WiFi at 952, a user identification 954 and password 956 for a WiFi network, along with any security 958, are entered by a user. Connection is accomplished by choosing the connect option 962. Credentials may be saved using option 960 so that the WiFi network details are saved, and will be automatically filled the next time a connection is attempted.

Once connected to WiFi, or to another wireless communication system, such as a cellular telephone network, mesh network, or the like, the application will allow the board(s) in the deicing system to check for updates, and will install any updates found. Product identification 964, version 966, and control application version 968 are also displayed in one embodiment on the profile screen 950.

The control application discussed herein has been described in terms of an application on a mobile telephone, tablet computer, or the like. In another embodiment, control of a deicing system such as those described herein, as well as the control functions and operation described herein, may be implemented in a different form, such as a remote control operating on, for example, a radio frequency (RF) band of operation. Such a remote control has the functions and capabilities of the application embodied therein, and may include, for example, selection buttons, a keypad, number pad, touch screen, display, or the like. Other remote controls operating on other frequencies are also within the scope of the disclosure.

Figure 15:
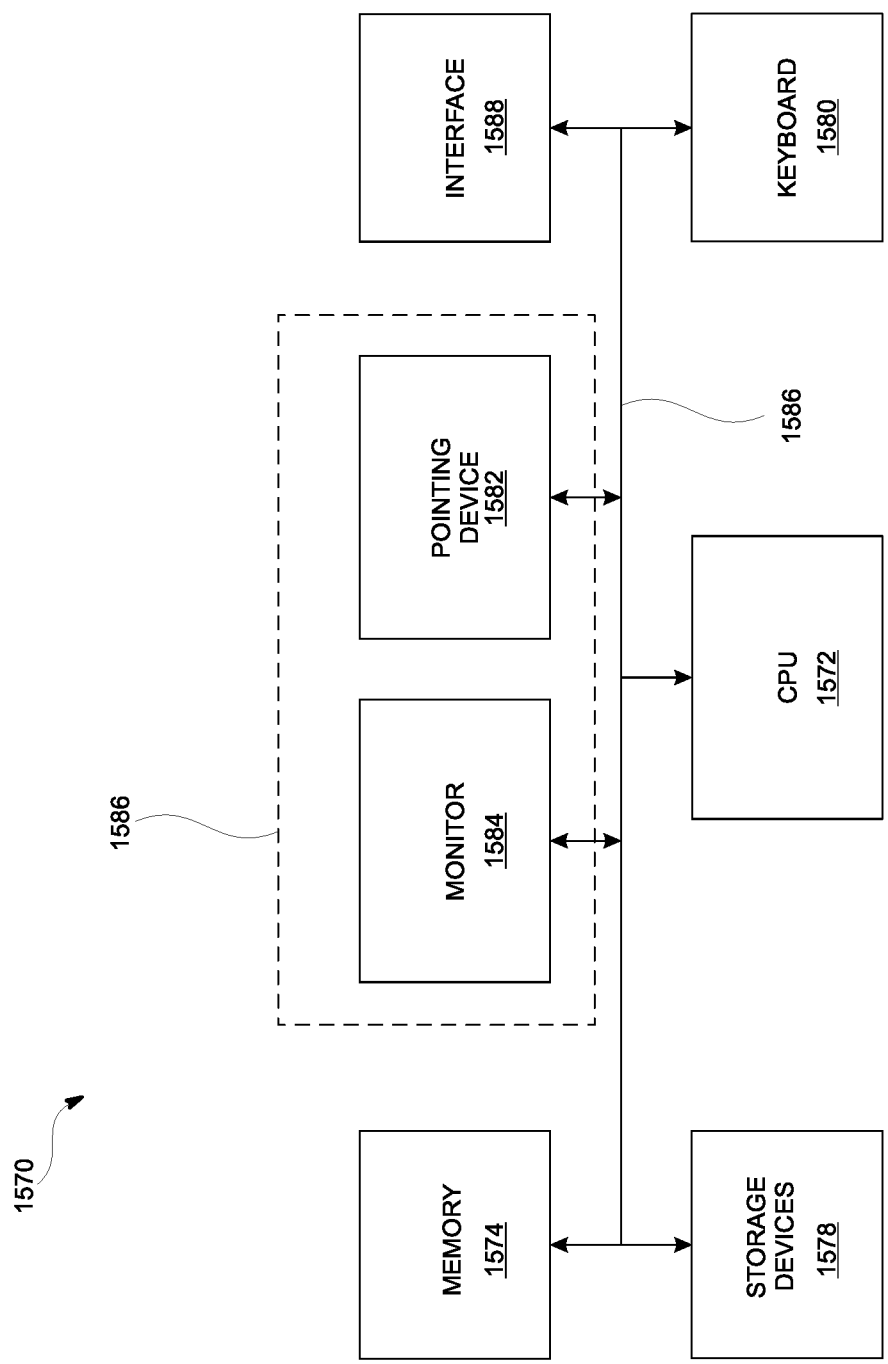
FIG. 15 is block diagram of a computer on which embodiments of the present disclosure may be practiced.

FIG. 15 shows a representative system that may be connected to and/or used to control embodiments of the present disclosure or a controller for those embodiments. The system 100 described herein is usable on all the embodiments herein described, and may be operable on a digital and/or analog computer. FIG. 15 and the related discussion provide a brief, general description of a suitable computing environment in which the controller can be implemented. Although not required, the controller can be implemented at least in part, in the general context of computer-executable instructions, such as program modules, being executed by a computer 1570 which may be connected in wired or wireless fashion to the controller. Generally, program modules include routine programs, objects, components, data structures, etc., which perform particular tasks or implement particular abstract data types. Those skilled in the art can implement the description herein as computer-executable instructions storable on a computer readable medium. Moreover, those skilled in the art will appreciate that the embodiments of the disclosure may be practiced with other computer system configurations, including mobile computers, tablet computers, cellular telephones, mobile telephones, multi-processor systems, networked personal computers, mini computers, main frame computers, and the like. Aspects of the disclosure may also be practiced in distributed computing environments where tasks are performed by remote processing devices that are linked through a communications network. In a distributed computer environment, program modules may be located in both local and remote memory storage devices.

The computer 1570 comprises a conventional computer having a central processing unit (CPU) 1572, memory 1574 and a system bus 1576, which couples various system components, including memory 1574 to the CPU 1572. The system bus 1576 may be any of several types of bus structures including a memory bus or a memory controller, a peripheral bus, and a local bus using any of a variety of bus architectures. The memory 1574 includes read only memory (ROM) and random access memory (RAM). A basic input/output (BIOS) containing the basic routine that helps to transfer information between elements within the computer 1570, such as during start-up, is stored in ROM. Storage devices 1578, such as a hard disk, a floppy disk drive, an optical disk drive, etc., are coupled to the system bus 1576 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 1574 from at least one of the storage devices 1578 with or without accompanying data.

Input devices such as a keyboard 1580 and/or pointing device (e.g. mouse, joystick(s)) 1582, touch screen, virtual controller such as a virtual reality (VR) set or an augmented reality (AR) set, or the like, allow the user to provide commands to the computer 1570. A monitor 1584 or other type of output device can be further connected to the system bus 1576 via a suitable interface and can provide feedback to the user. If the monitor 1584 is a touch screen, the pointing device 1582 can be incorporated therewith. The monitor 1584 and input pointing device 1582 such as mouse together with corresponding software drivers can form a graphical user interface (GUI) 1586 for computer 1570. Interfaces 1588 on the computer 1570 allow communication to other computer systems such as via the peer-to-peer embodiments discussed above.

Figure 16:
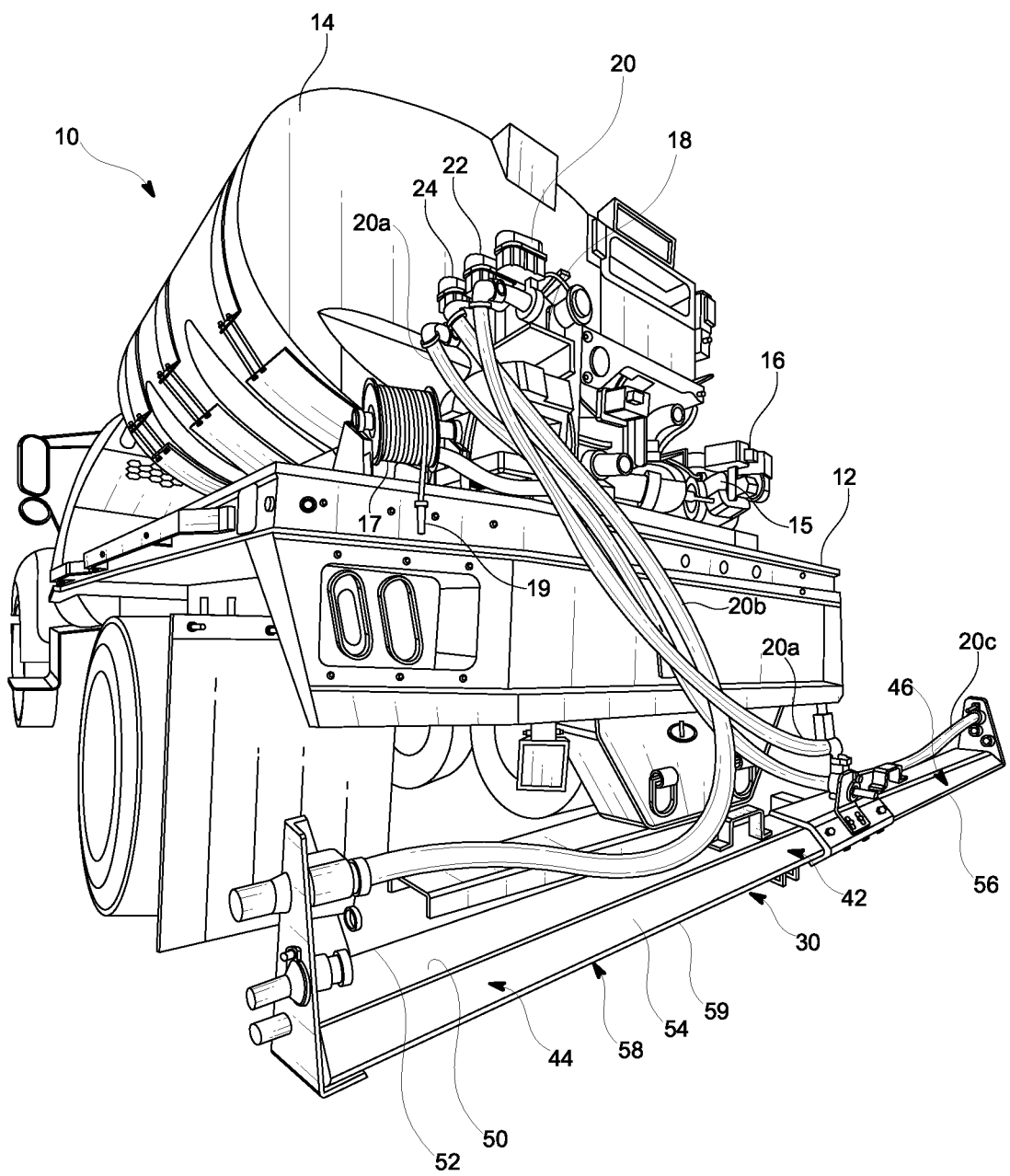
FIG. 16 is a perspective view a modular deicing boom attached to a prime mover om which embodiments of the present disclosure may be practiced.

FIG. 16 is a perspective view of a modular deicing boom attached to a prime mover om which embodiments of the present disclosure may be practiced. A boom for dispensing deicing solution and being mounted to a prime mover 10 is illustrated in FIG. 16 at 30. The boom 30 is modular and shipped disassembled, which results in compact, less expensive shipping and is assembled using bolts and nuts, making assembly efficient and straight forward. While bolts and nuts are typical connecting mechanisms, other connecting mechanisms are also within the scope of the present disclosure.

The boom 30 is used to dispense a brine solution of salt (NaCl) and/or salt (NaCl) mixed with another salt, typically a divalent salt such as, but not limited to, calcium chloride ($CaCl_2$), where other salt is added to reduce or depress the freezing point of the brine solution based upon the ambient temperature. The boom 30 is used to dispense the brine to remove snow and/or ice from a surface, such as runways, streets, parking lots and walkways at temperatures well be 0° F., where rock salt is ineffective. The boom can also be used to pretreat a surface with brine prior to a snowfall.

While brine solutions are described herein, the boom of the present disclosure can be used with any liquid and for purposes besides melting snow and ice and/pretreating a surface. It is within the scope of the present disclosure that a solution without chloride ions could be utilized to pretreat surfaces prior to a snowfall or to remove snow and ice after a snowfall.

The illustrated prime mover 10 includes a bed 12 that supports a brine tank 14 and a pump 16 that is fluidly coupled to the brine tank 14 with a hose 15. The pump 16 discharges into a manifold 18 that controls the flow of brine to a boom pipe and one or more nozzles extending from opposing end caps or a nozzle substantially centrally located on the boom using a plurality of control valves 20, 22, and 24 that are fluidly coupled to the one or more nozzles with hoses 20a, 22a and 24a, respectively. The control valves 20, 22 and 24 allow an operator to direct the brine solution to selected brine dispensers to remove snow and ice. In some instances, the operator may desire to remove snow and ice manually, at which time a hose reel having a retractable hose 17 with a sprayer 19 may be utilized to deliver the brine solution to the selected area.

As illustrated the boom 30 is sized to be used with a commercial driver's license (CDL) sized truck where the boom is about 100 inches in length. The length of the boom can be varied to accommodate different vehicles. By way of example, an 84-inch boom is typically utilized with a pickup truck and a 48-inch boom is utilized with a UTV. The sizes of the modular booms discussed herein are exemplary and non-limiting in nature, and the size of the modular boom 30 can be selected to accommodate any vehicle.

Referring to FIG. 16, the boom 30 is illustrated being mounted to a hitch receiver on the prime mover 10 by securing a draw bar 32 attached to the boom 30 within the hitch receiver. The draw bar 32 includes a first U-shaped mounting bracket 34 with a plurality of aligned apertures 36 that are configured to align with apertures in a second U-shaped mounting bracket 37 having a plurality of aligned apertures 40, where the second U-shaped mounting bracket 37 is secured to a central bracket 38 of the boom 30. The boom 30 can be adjusted to a selected height relative to the surface to accommodate different snow depths. The boom 30 is secured at the selected height with bolts or pins being inserted through the aligned apertures 36 and 40. In other instances, when a hitch is unavailable, the boom 30 can be directly mounted to the prime mover 10.

Referring to FIG. 16, the modular boom 30 includes a boom shroud 42 that includes a left section 44 and a right section 46 that are substantially mirror images of each other. The left section 44 and the right section 46 of the boom shroud 42 are typically formed from sheet metal. However, other materials of construction are also contemplated.

The left and right sections 44 and 46 have a substantially horizontal upper portion 50 and a front portion 52 extending is substantially normal to the substantially horizontal upper portion 50. A top, downwardly sloped surface 54 extends from the horizontal upper portion at an obtuse angle. A bottom sloped surface 56 extends from the top sloped surface 54 in an acute angle and toward the upper portion 50 to form a wedge-shaped back portion 58.

The wedge portion 58 has a sharp bend 59 along the length of both the left and right sections 44 and 46 that provides a point of contact with a pile of snow or a windrow. With the point of contact with the snow being the bend 59, as the prime mover 10 is moved in reverse, the wedge portion 58 allows snow to flow over and under the boom shroud 42 which disperses the force as the boom 30 is moved through the pile of snow or windrow while maintaining the structural integrity of the boom 30.

Although the present disclosure has been described with reference to preferred embodiments, workers skilled in the art will recognize that changes may be made in form and detail without departing from the spirit and scope of the disclosure.

What is claimed is:

1. A method of operating a deicing system remotely, comprising:
    connecting, by one or more processors of a computing device, a control for the deicing system with the deicing system;
    providing, by the one or more processors, functionality for controlling operation of the deicing system, wherein, in providing functionality for controlling operation, providing control of application rates by:
        determining, by the one or more processors, a deicing fluid application rate, and
        transmitting, by the one or more processors and responsive to the determining, control signals to the deicing system, the control signals instructing the deicing system to apply deicing fluid to a job site in accordance with the deicing fluid application rate; and
    managing, by the one or more processors, workflow and operation including job tracking, wherein managing the workflow includes:
        tracking data for hose reel usage of the deicing system;
        preparing a report for each individual job, including the tracked data; and
        providing a reporting operation for mobile reporting of a job via wireless communication.

2. The method of claim 1, wherein connecting a control for the deicing system comprises connecting via a wireless connection.

3. The method of claim 1, wherein the control of application rates includes automatic control of application rates and, in providing automatic control of application rates:
    determining a speed of travel of the deicing system;
    wherein the deicing fluid application rate includes a predetermined area rate based on the speed of travel of the deicing system, a desired spray width, and a desired application rate of the deicing fluid.

4. The method of claim 3, wherein applying deicing fluid is modified by a user manually selecting an increased application rate, the increased application rate pre-saved in the deicing system or selectable by a user, for a section of the job site.

5. The method of claim 1, wherein the control of application rates includes manual control of application rates and, in providing manual control of application rates:
    determining a speed of travel of the deicing system; and
    wherein the deicing fluid application rate includes a user-defined flow rate adjusted by a speed of travel of the deicing system and a desired spray width.

6. The method of claim 5, wherein applying deicing fluid is modified by a user selecting an ice buster application rate manually for a section of the job site.

7. The method of claim 1, wherein in determining the deicing fluid application rate:
    receiving a manual or automatic application of deicing fluid based on a flow rate or area rate of application; and wherein the manual or automatic application of deicing fluid includes applying at the flow rate adjusted by a speed of travel of the deicing system for manual operation, or applying at the area rate adjusted by a speed of travel of the deicing system for automatic operation.

8. The method of claim 7, wherein the speed of travel of the deicing system is determined by a global positioning system receiver.

9. The method of claim 1, wherein providing functionality for controlling operation further comprises providing control of operation of a boom system of the deicing system.

10. The method of claim 1, wherein providing functionality for controlling operation further comprises providing control of an engine of the deicing system, including start and stop of the engine, and choke and throttle control.

11. The method of claim 1, wherein providing functionality for controlling operation further comprises providing control of lights and strobes of the deicing system.

12. The method of claim 1, wherein providing functionality for controlling operation further comprises providing control of a hose reel rewinder of the deicing system.

13. The method of claim 1, wherein managing workflow further comprises:
tracking all jobs for a defined event;
tracking all jobs for a defined season; and
providing a report capability for the defined event, the defined season, or both the defined event and the defined season.

14. The method of claim 1, wherein providing functionality for control of the deicing system further comprises tracking lifetime operation of the deicing system for maintenance purposes.

15. The method of claim 1, wherein connecting a control is performed over a wireless connection.

16. A non-transitory computer-readable storage medium including instructions that, when executed by one or more processors of a computer, cause the computer to:
connect a control for a deicing system with the deicing system;
provide functionality for controlling operation of the deicing system, wherein, in providing functionality for controlling operation, providing control of application rates by:
determining a deicing fluid application rate, and
transmitting, responsive to the determining, control signals to the deicing system, the control signals instructing the deicing system to apply deicing fluid to a job site in accordance with the deicing fluid application rate; and
manage workflow and operation including job tracking, wherein managing the workflow includes:
tracking data for hose reel usage of the deicing system;
preparing a report for each individual job, including the tracked data; and
providing a reporting operation for mobile reporting of a job via wireless communication.

17. The non-transitory computer-readable storage medium of claim 16, wherein the control of application rates includes automatic control of application rates and, in providing automatic control of application rates:
determining a speed of travel of the deicing system;
wherein the deicing fluid application rate includes a predetermined area rate based on the speed of travel of the deicing system.

18. The non-transitory computer-readable storage medium of claim 16, wherein the control of applications rates is manual control of application rates and, in providing manual control of application rates:
determining a speed of travel of the deicing system; and
wherein the deicing fluid application rate includes a user-defined flow rate adjusted by the speed of travel of the deicing system.

19. A mobile application for control of a deicing system, comprising:
providing functionality to control functions of the deicing system via a computing device including:
controlling, by one or more processors of the computing device, application rate of deicing fluid based upon travel speed of the deicing system;
monitoring, by the one or more processors, deicing fluid tank level;
controlling, by the one or more processors, lights and strobes on the deicing system;
controlling, by the one or more processors, start/stop, choke, and throttle position on a power unit of the deicing system remotely;
rewinding, by the one or more processors, a hose reel of the deicing system;
tracking, by the one or more processors, jobs, overall system usage, hose reel usage, temperature, travel speed of the deicing system, and average application rate of the deicing system; and
sending, by the one or more processors, reports with details of performed deicing jobs including job details remotely.

20. The mobile application of claim 19, wherein the mobile application provides functionality to send reports as files to email addresses.

21. The mobile application of claim 19, wherein the mobile application provides functionality to integrate reports into billing systems without need for paper tracking.

* * * * *